(12) United States Patent
Kurematsu

(10) Patent No.: US 7,918,754 B2
(45) Date of Patent: Apr. 5, 2011

(54) HYDRAULIC TENSIONER

(75) Inventor: Yugi Kurematsu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 445 days.

(21) Appl. No.: 12/061,180

(22) Filed: Apr. 2, 2008

(65) Prior Publication Data

US 2008/0318717 A1 Dec. 25, 2008

(30) Foreign Application Priority Data

Jun. 25, 2007 (JP) .................. 2007-166839

(51) Int. Cl.
*F16H 7/22* (2006.01)
(52) U.S. Cl. ....................... 474/110; 474/111
(58) Field of Classification Search .......... 474/109–111, 474/113–115, 133–136
See application file for complete search history.

(56) References Cited

U.S. PATENT DOCUMENTS

| 4,792,322 | A | * | 12/1988 | Goppelt et al. | ............... 474/136 |
| 4,963,121 | A | | 10/1990 | Himura et al. | |
| 5,352,159 | A | | 10/1994 | Suzuki et al. | |
| 5,908,363 | A | * | 6/1999 | Suzuki | ........................ 474/101 |
| 6,045,471 | A | | 4/2000 | Suzuki | |
| 6,086,497 | A | * | 7/2000 | Fukuda et al. | ................ 474/110 |
| 6,602,154 | B1 | * | 8/2003 | Guichard et al. | ............ 474/110 |

FOREIGN PATENT DOCUMENTS

| GB | 2308420 A | 6/1997 |
| JP | 10-159921 | 6/1998 |
| JP | 3897317 B2 | 1/2007 |
| JP | 2007-071310 A | 3/2007 |

* cited by examiner

*Primary Examiner* — Sang Kim
(74) *Attorney, Agent, or Firm* — Howson & Howson LLP

(57) ABSTRACT

A hydraulic tensioner comprises a plunger, and a plunger-accommodating hole in a tensioner housing, together forming a high pressure oil chamber. A plunger-biasing spring is provided in the high pressure oil chamber between the plunger and the bottom of the plunger-accommodating hole. An oil storage chamber is formed inside the plunger, and a check valve unit is press-fit in the rear end of the plunger to allow flow from the oil storage chamber to the high pressure oil chamber while blocking reverse flow of oil.

2 Claims, 11 Drawing Sheets

HYDRAULIC TENSIONER

CROSS-REFERENCE TO RELATED APPLICATION

This application claims priority on the basis of Japanese patent application 2007-166839, filed Jun. 25, 2007. The disclosure of Japanese application 2007-166839 is hereby incorporated by reference.

FIELD OF THE INVENTION

This invention relates to hydraulic tensioners for maintaining proper tension in a timing chain such as a roller chain, a silent chain, or the like, in a vehicle engine. The invention relates more specifically to a hydraulic tensioner in which an oil storage chamber is formed within the plunger of the tensioner.

BACKGROUND OF THE INVENTION

Hydraulic tensioners comprising housings with protruding plungers have been used in vehicle engines for maintaining tension in timing chains that transmit rotation from an engine crankshaft to one or more valve-operating camshafts. The plunger usually engages a movable guide having a shoe on which a portion of the chain traveling away from a crankshaft sprocket slides. The plunger is urged by a plunger-biasing spring in the protruding direction, and the plunger and a portion of a plunger-receiving hole in the tensioner housing together form a high pressure oil chamber for containing oil that leaks through a restricted path, usually between the plunger and the wall of the plunger-receiving hole. Leakage of the oil has a damping effect on retracting movement of the plunger, thereby suppressing vibrations while maintaining proper tension.

Tensioners are mounted in various orientations on an engine block, depending on available space and on the presence of other engine parts. These mounting orientations include orientations in which the plunger protrudes upward, or obliquely upward.

U.S. Pat. No. 6,045,471 describes a tensioner having an upwardly protruding plunger. The tensioner has a hydraulic buffer mechanism comprising a hollow, tubular, plunger sleeve formed with a plunger insert bore extending axially through the sleeve. A plunger fits slidably in the plunger insert bore, with its ends projecting axially from the ends of the sleeve. The sleeve is slidable in a plunger sleeve-receiving bore of a housing having an open front end and a closed bottom end. The plunger-receiving bore is formed as a continuation of the rear of the plunger sleeve, and the rear portion of the plunger, projecting from the rear end of the sleeve, is slidable in the plunger-receiving bore. A high pressure oil chamber is formed between the bottom of the plunger-receiving bore and the rear end of the plunger. A check valve incorporated into the rear end of the plunger provides an oil path for flow or oil into the high pressure chamber from an oil supply reservoir inside the plunger. Oil is supplied to the oil supply reservoir from a source external to the plunger housing through an oil supply passage open at a rear portion of the plunger sleeve-accommodating hole in the plunger housing, and an oil supply hole provided on the outer circumferential surface of the plunger.

An anti-retrograde mechanism is provided between the plunger housing and the plunger sleeve to allow only forward displacement of the sleeve with respect to the plunger housing. A plunger spring, provided on the circumference of a portion of the plunger projecting from the front end of the plunger sleeve, urges the plunger in the protruding direction, and a sleeve spring provided between the plunger housing and the plunger sleeve, and having a smaller spring constant than the plunger spring, urges the plunger sleeve forward. When a shock load acts on the front end of the plunger, leakage of oil from the high pressure chamber through a restricted clearance buffers the shock load. The restricted clearance is proved by the sliding engagement between the inner peripheral surface of the plunger-receiving bore and the outer peripheral surface of the plunger.

The above-described hydraulic shock-absorbing tensioner has a greater number of parts than the usual conventional tensioner and a more complicated structure, since it includes a plunger sleeve and a sleeve spring fitted between the plunger housing and the plunger. The overall length of the plunger is necessarily greater than the length of a plunger in the usual hydraulic tensioner. Moreover, even though the plunger is longer than a conventional plunger, the internal space available for storage of oil within the plunger is limited, and is inadequate under some conditions of operation where the demand for oil in the high pressure oil chamber is high.

In the above-described hydraulic shock-absorbing tensioner, the overlap of the mutually sliding surfaces of the plunger housing and the plunger is short, and consequently the leakage of oil through the restricted clearance between these mutually sliding surfaces can become excessive. When the engine is not operated over an extended period of time, oil drainage from the oil reservoir and the high pressure chamber occurs as a result of leakage. Then, when the engine is re-started, the hydraulic damping force exerted as a result of oil leakage cannot be realized until oil is restored in the oil reservoir and in the high pressure oil chamber. As a result, troublesome backlash of the engine timing chain occurs on engine start-up, abnormal sounds are generated, and unexpected damage can occur. Furthermore, when the plunger of the tensioner advances as a result of elongation of the timing chain, the backlash on engine start-up is exaggerated. Similar exaggeration of backlash in the engine timing drive can occur when the tensioner is mounted so that the plunger protrudes upward at a small angle relative to the horizontal.

Accordingly, an object of the invention is to overcome the above-mentioned problems of the prior art, and to achieve one or more of the following advantages, namely: providing a hydraulic tensioner that has an sufficient oil reservoir located within its plunger, ensuring an adequate supply of oil to its high pressure oil chamber upon engine start-up even when the engine has not been operated for a long interval of time; rapidly exhibiting hydraulic damping upon engine start-up; preventing backlash and abnormal sounds; and avoiding a large number of parts.

SUMMARY OF THE INVENTION

The hydraulic tensioner according to the invention comprises a housing having a plunger-accommodating hole and a plunger slidable in the plunger-accommodating hole and protruding therefrom in a protruding direction. The plunger applies tension to an endless, flexible, traveling, timing transmission chain. The plunger has a hollow bore extending from a rear end of the plunger to an internal location adjacent an opposite end of the plunger. The hollow bore forms an internal oil storage space within the plunger. A plunger-biasing spring, which urges the plunger in the protruding direction, is accommodated in a high pressure oil chamber formed between the plunger-accommodating hole and the rear end of the plunger. A check valve unit, press-fit in the rear end of the plunger, and closing its internal oil storage space, allows flow of oil from the internal oil storage space to the high pressure oil chamber while blocking reverse flow of oil from the high pressure oil chamber to the oil storage space.

In a preferred embodiment of the invention, an oil supply hole connects the internal oil storage chamber to the exterior of the plunger in order to supply oil to the internal oil storage chamber, and the housing has an oil supply bore providing a path for flow of oil from the exterior of the housing to the interior of the plunger-accommodating hole. The plunger has a recess formed in its outer peripheral surface, and the oil supply hole in the plunger has an opening within the recess. The oil supply hole is preferably located on a ridge line of the plunger, the ridge line being defined as the locus of the highest points of cross-sections of the plunger taken on planes to which the direction of protrusion of the plunger is perpendicular.

The length of the recess, in the direction of protrusion of the plunger, should be sufficient that the oil supply bore is in register with the recess throughout the stroke of the plunger, in order to allow flow of oil from the oil supply bore to the oil supply hole. The length of the recess is preferably equal to the maximum stroke of the plunger.

The bore within the plunger extends nearly the entire length of the plunger and can have a large diameter corresponding to the diameter of the plunger-receiving hole less twice the thickness of the wall of the plunger. As a result, the volume of the oil storage chamber formed by the bore in the plunger can be made sufficiently large to ensure an adequate supply of oil to the high pressure chamber of the tensioner. Thus, when the plunger is pushed into the plunger-accommodating hole, the supply of oil in the high pressure chamber is always sufficient to damp the movement of the plunger. Furthermore, when the plunger protrudes rapidly from the plunger-accommodating hole, causing the oil pressure in the high pressure chamber to drop, the oil in the high pressure oil chamber is replenished rapidly so that hydraulic damping can take place instantaneously when the plunger is again pushed into the plunger-accommodating hole. As a result, backlash of the timing chain is suppressed on engine start-up, and the generation of abnormal sounds is prevented.

Positioning the oil supply hole in the plunger on the ridge line of said plunger allows optimum utilization of the available oil storage space in the oil storage chamber inside the plunger.

The recess in the surface of the plunger maintains fluid communication between the oil supply bore in the tensioner housing and the oil supply hole in the plunger throughout the stroke of the plunger. Thus a reliable supply of oil is provided, through the housing, to the oil storage chamber inside the plunger. Additionally, the number of parts required in the tensioner is small compared to the number of parts in a tensioner utilizing a plunger sleeve, and the tensioner is comparatively easy to manufacture because difficult machining of the inside wall of the plunger-accommodating hole in the housing is unnecessary. When the length of the recess is sufficient that the oil supply bore is always in register with the recess throughout the stroke of the plunger, oil is always allowed to flow from the oil supply bore to the oil supply hole, ensuring an adequate supply of oil in the oil storage chamber inside the plunger. Furthermore, when the length of the recess is made is equal to the maximum stroke of the plunger, the overall length of the tensioner housing can be kept at a minimum.

DETAILED DESCRIPTION OF THE PREFERRED EMBODIMENTS

The invention will be described in the context of a ratchet-type hydraulic tensioner adapted for use with a pivoted chain guide or lever to maintain tension in the timing chain of a vehicle engine. However, the invention can be embodied in a tensioner wither with or without a ratchet mechanism, and also in a tensioner in which a chain guide is carried by a plunger.

The hydraulic tensioner of the invention is preferably attached in a vehicle engine in such a way that its plunger protrudes upward at an angle relative to the horizontal. However, the tensioner can be disposed so that its plunger protrudes horizontally or downward at an angle relative to the horizontal.

Figure 1:
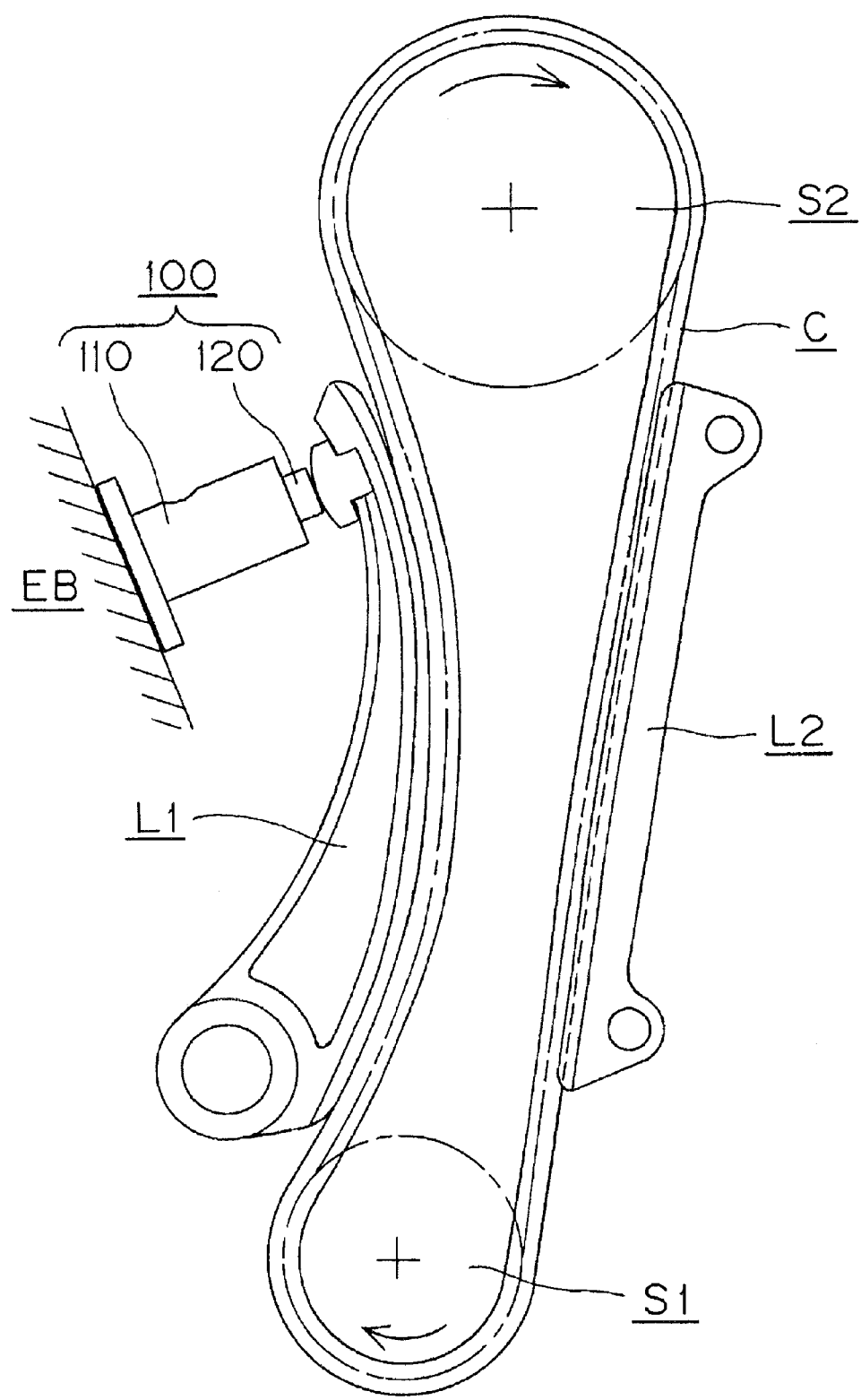
FIG. 1 is a schematic elevational view of an engine timing transmission using a hydraulic tensioner in accordance with the invention.

As shown in FIG. 1, a hydraulic tensioner 100, is attached to an engine body EB on the slack side of a timing chain C, which is extends from a crankshaft sprocket S1 to a camshaft sprocket S2. Arrows indicate the direction of rotation of the sprockets. A plunger 120 of the hydraulic tensioner 100 protrudes from the front of a tensioner housing 110, and engages the back of a pivoted lever L1 which is pivoted on the engine. The plunger engages the back of the lever at a location remote from the lever's pivot axis. The lever, in turn, is in sliding engagement with the chain C and applies tension to the slack side of the chain. A fixed guide L2 is in sliding engagement with the tension side of the chain.

Figure 2:
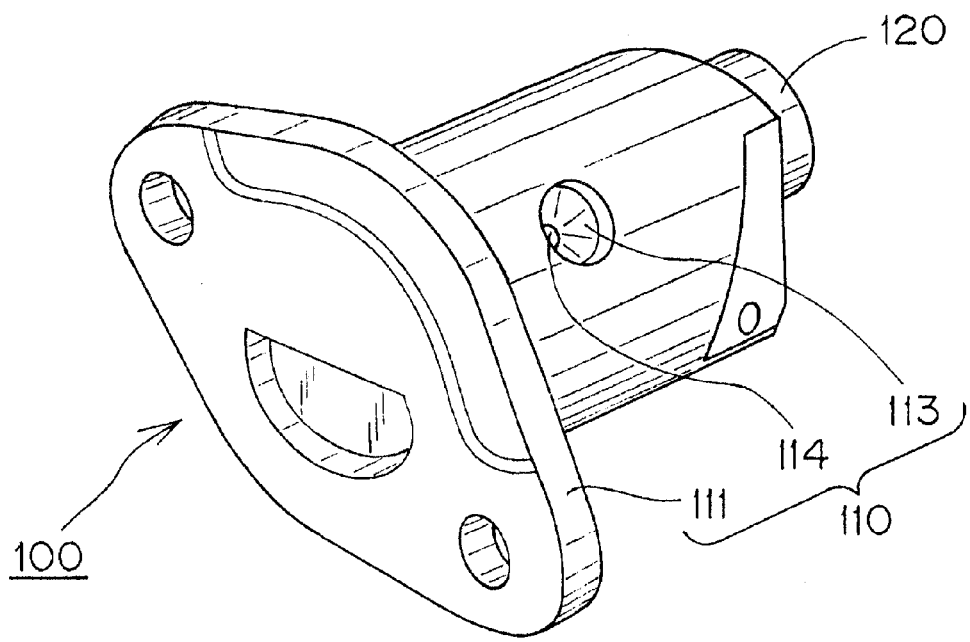
FIG. 2 is a perspective view of the tensioner, as viewed from the rear.
Figure 3:
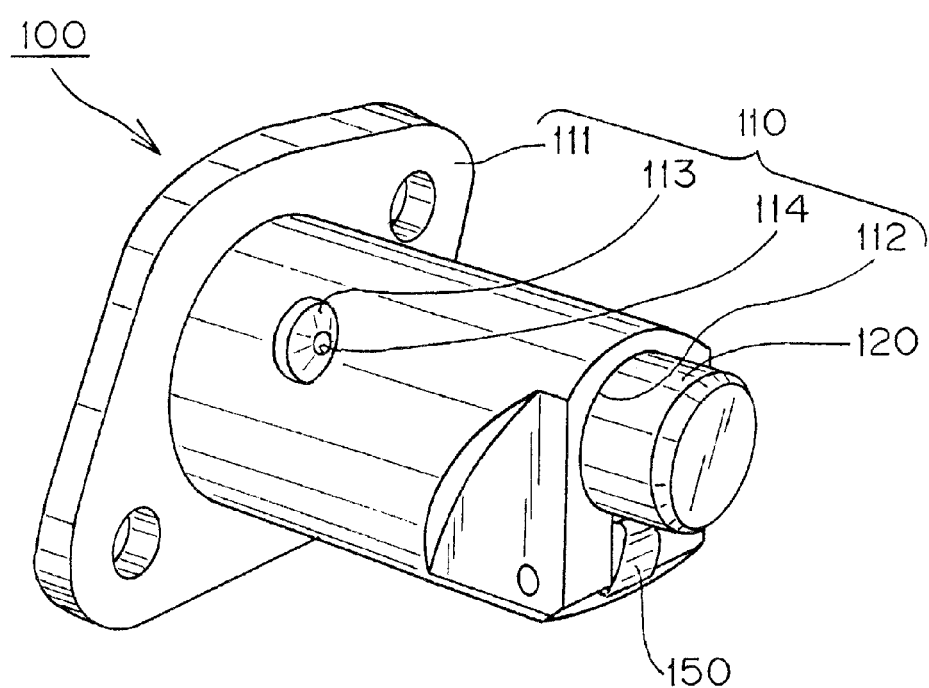
FIG. 3 is a perspective view of the tensioner as viewed from the front.

As shown in FIGS. 2 and 3, the tensioner housing 110 is attachable to an engine by an attachment plate 111 at the rear of the housing. As seen in FIG. 3, the plunger 120 protrudes from a plunger-accommodating hole 112 in the housing 110. The plunger is urged in the protruding direction by a plunger-biasing spring 130, shown in FIG. 7. the spring 130 is a coil spring in compression within a high pressure oil chamber R formed in the plunger accommodating hole 112 between the rear end of the plunger 120 and the bottom of the plunger-accommodating hole.

Figure 4:
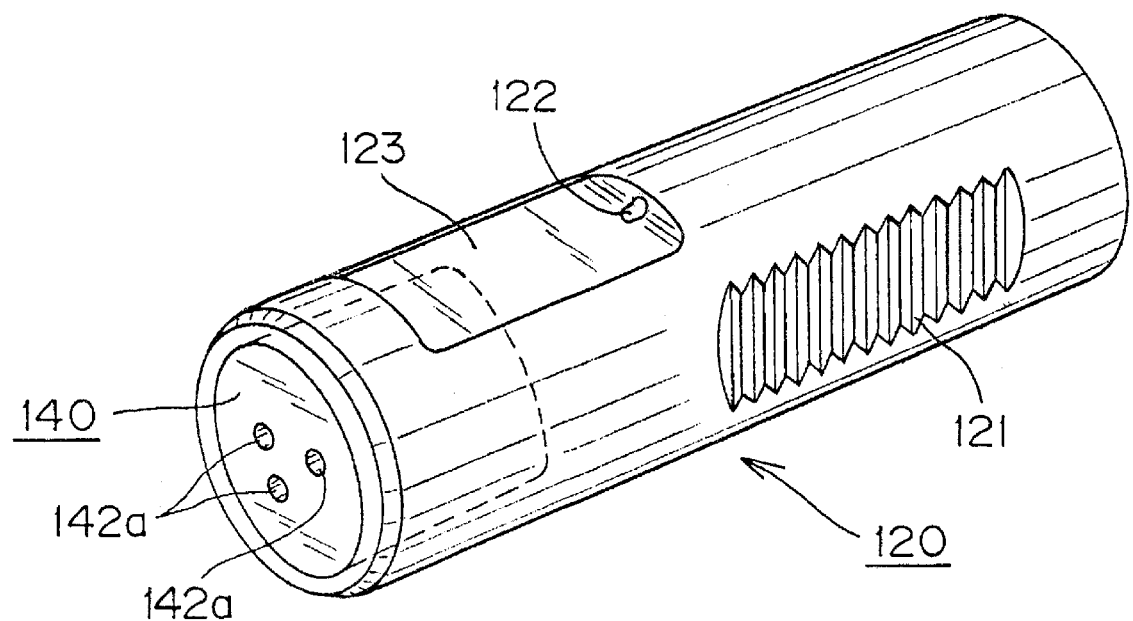
FIG. 4 is a perspective view of the plunger of the tensioner.
Figure 5:
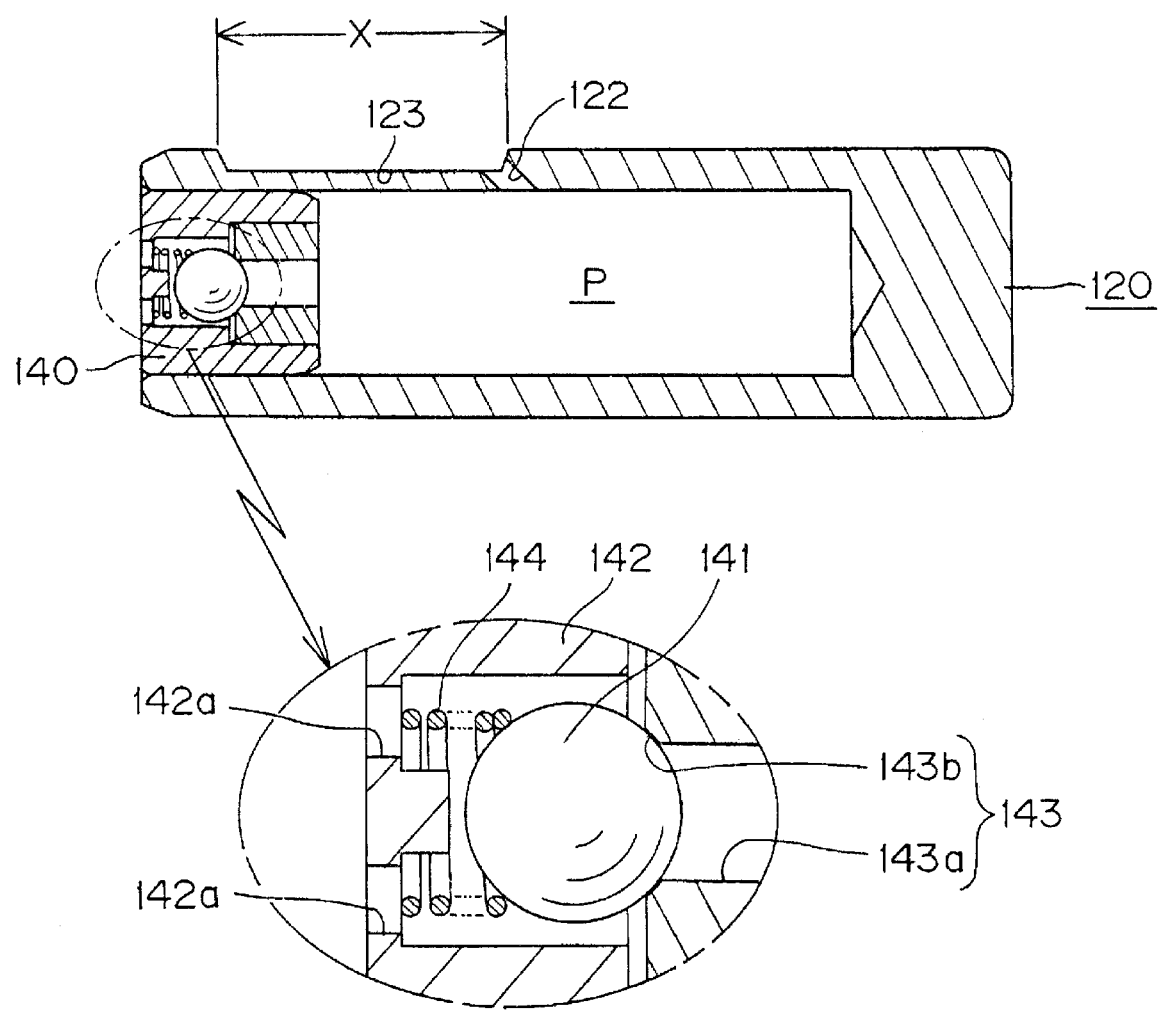
FIG. 5 is a longitudinal cross-sectional view of the plunger, including an enlargement of the check valve of the plunger as an auxiliary view.

As seen in FIG. 5, the plunger has an internal bore extending axially from its rear end to a location adjacent its protruding end. FIGS. 4 and 5 show a check valve unit 140, which is press-fit into the bore of the plunger at the rear end of the plunger, closing off the rear opening of the bore and forming an internal oil storage chamber P within the plunger. The check valve permits flow of oil outward from the storage chamber P into the high pressure oil chamber R, but blocks reverse flow of oil from the high pressure oil chamber R into the oil storage chamber P. A ratchet mechanism 150, comprising a pivoted pawl 151 and a pawl-biasing spring 152, cooperates with a rack 121 formed on the outer circumferential surface of the plunger 120 to allow the plunger to proceed gradually in the protruding direction as chain elongation occurs. The ratchet mechanism, however, permits only a limited degree of retracting movement of the plunger when a force is applied to the plunger by the chain through the pivoted lever.

As shown in FIGS. 4 and 5, the check valve unit 140 includes a check ball 141 within a ball guide 142, which is the part that is press-fit into the plunger. The ball fits loosely in the ball guide and can move toward and away from a ball seat 143 which is press-fit into the ball guide. The ball seat has an oil passage 143a communicating with the oil storage chamber P and an annular seating surface 143b engageable by the check ball to close off the passage 143a. The check ball is urged against the seating surface 143b by, a ball-biasing spring 144. Holes 142a in the bottom of the ball guide are provided to allow oil to flow from the oil storage chamber P, through the check valve unit, to the high pressure oil chamber R.

Figure 6:
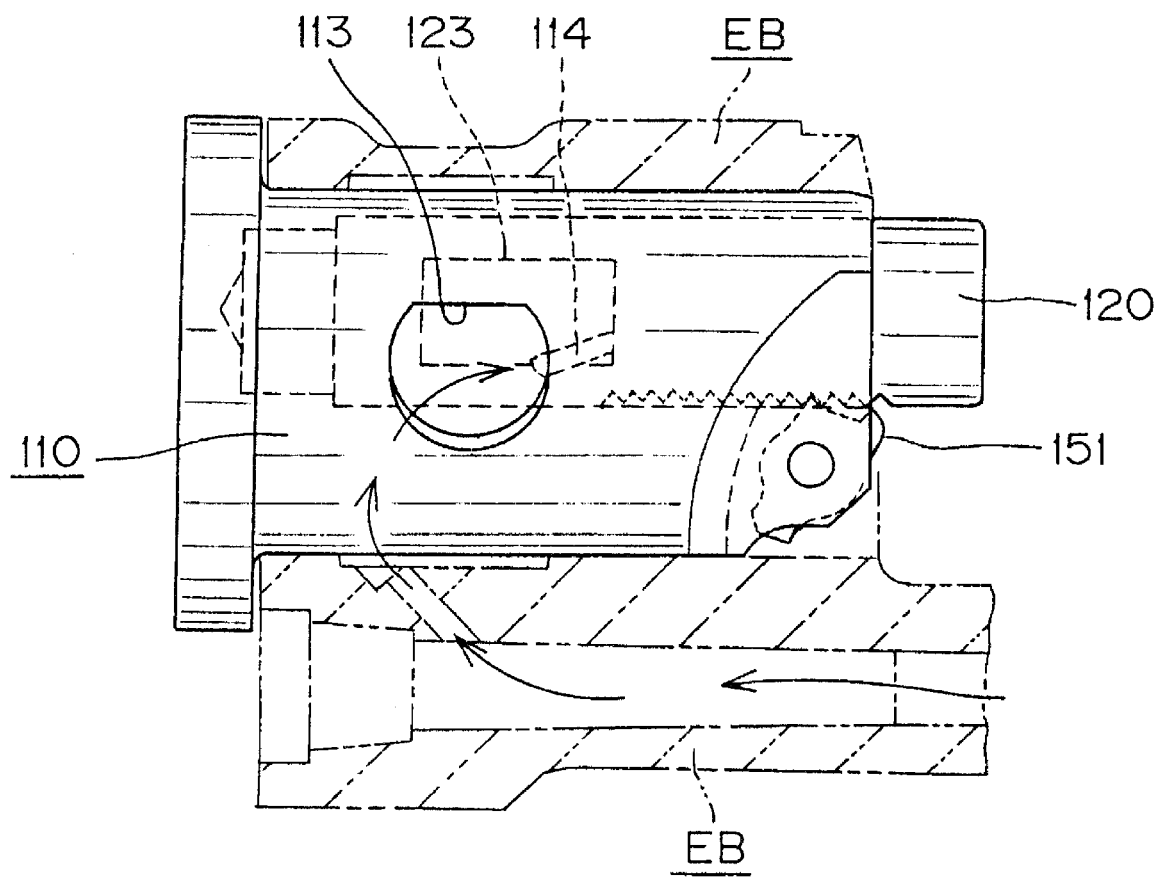
FIG. 6 is a schematic elevational view showing the hydraulic tensioner attached to an engine, and illustrating the path of oil flow into the oil reservoir in interior of plunger.
Figure 7:
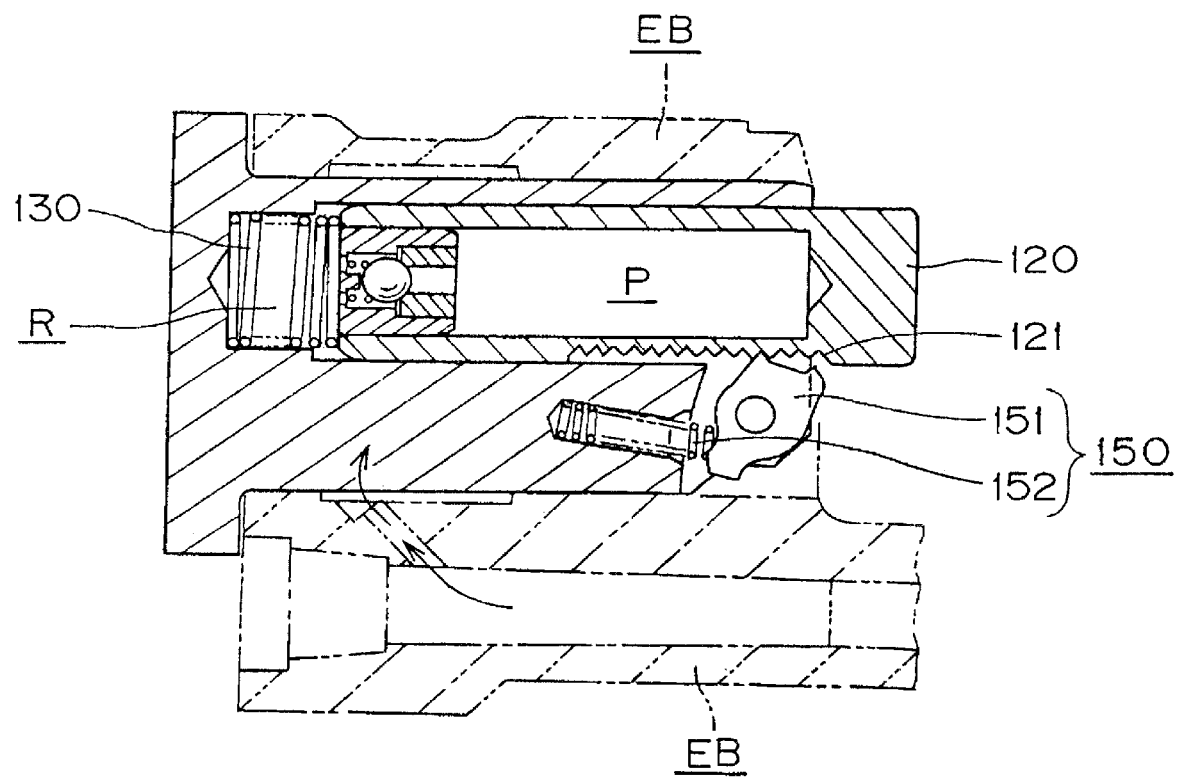
FIG. 7 is a cross-sectional view of the assembly shown in FIG. 6.

As shown in FIGS. 2 and 3, the tensioner housing has a concave dimple 113 formed in its exterior wall, leading to an oil supply bore 114 that extends through the wall of the housing and has an inner opening at the wall of the plunger-accommodating hole 112. FIGS. 6-10 illustrate the paths of oil flow from the engine oil supply into the oil storage chamber P inside the plunger. As shown in FIGS. 6 and 7, the tensioner housing is mounted in a part of the engine body EB illustrated in broken lines. Oil, following the path indicated by arrows, flows through a passage into an annular groove surrounding the tensioner housing. The portion of the housing wall in which the dimple 113 is located is surrounded by the annular groove, and thus oil can flow through the groove to the dimple, and from the dimple to the interior of the housing through oil supply bore 114.

Figure 8:
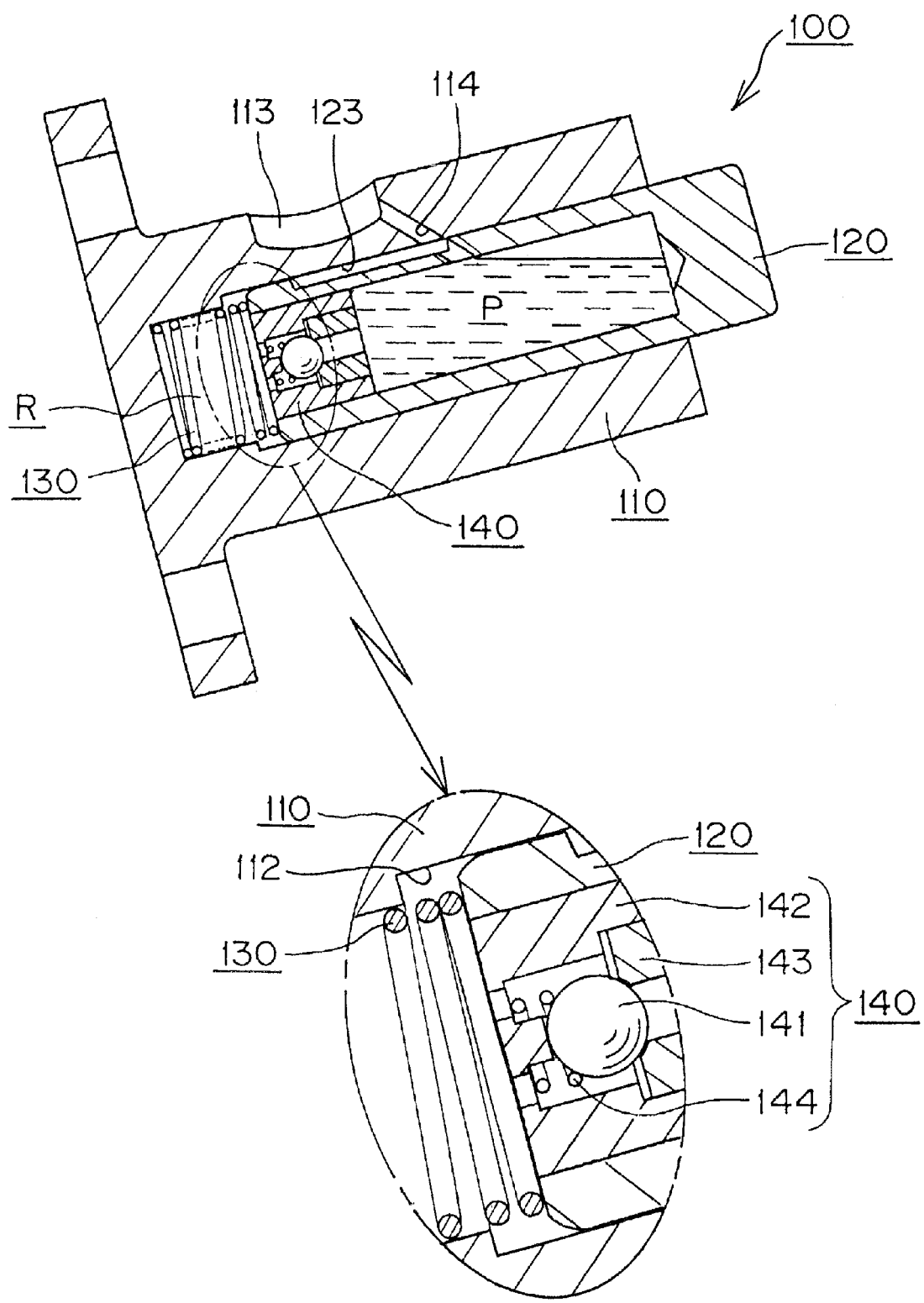
FIG. 8 is a cross-sectional view of the tensioner, showing oil stored in the oil reservoir inside the plunger, including an enlargement of a part of the plunger-biasing spring and the check valve as an auxiliary view.
Figure 9:
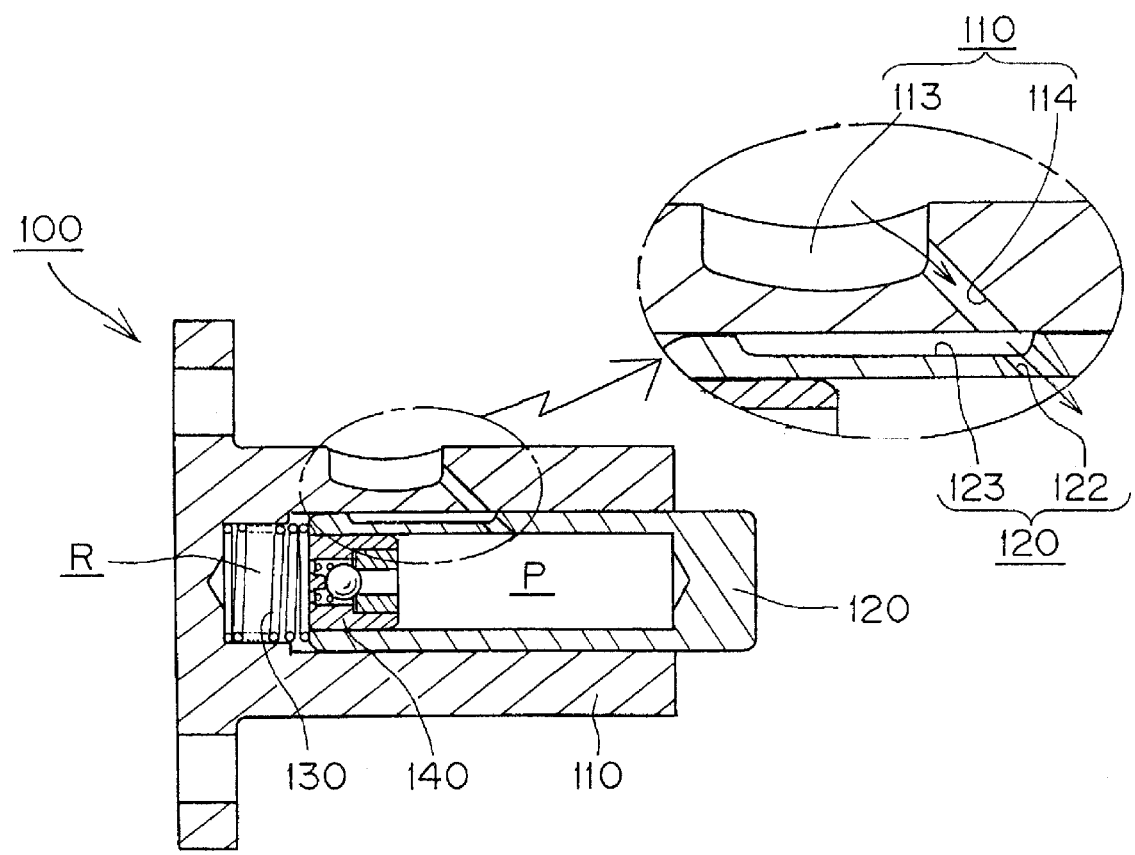
FIG. 9 is a cross-sectional view of the tensioner, showing the communication path for entry of oil into the reservoir within the plunger, when the plunger is in an initial retracted condition, including an enlarged auxiliary view of the oil flow path.

As shown in FIG. 8, the oil supply bore 114 is slanted downward from the bottom portion of the concave dimple 113 Thus oil flows downward through bore 114. The bore 114 is also slanted in the direction of protrusion of the plunger 120 so that its opening at the inner wall of the plunger-accommodating hole is located well forward of the bottom of the plunger-accommodating hole. As shown in FIG. 9, an oil supply hole 122 extends through the wall of the plunger to the oil storage chamber P. With the opening of bore 114 located well forward of the bottom of the plunger-accommodating hole, oil can fill most of the internal oil storage space within the plunger.

The oil supply hole 122 is located on the ridge line of the plunger, i.e., on the locus of the highest points of cross-sections of the plunger taken on planes to which the direction of protrusion of the plunger is perpendicular. Since the rack 121 of the plunger must cooperate with the ratchet mechanism 150, the location of the line of the plunger is necessarily in a predetermined relationship with the rack.

A groove 123 in the outer periphery of the plunger provides communication between the oil supply bore 114 in the housing 110 with the oil supply hole 122 in the plunger 120. The groove 123 provides oil communication throughout the entire stroke of the plunger, without the need for a complicated tensioner structure in which a plunger sleeve and a sleeve spring are fitted between the housing and the plunger as in a conventional hydraulic shock-absorbing tensioner.

Figure 10:
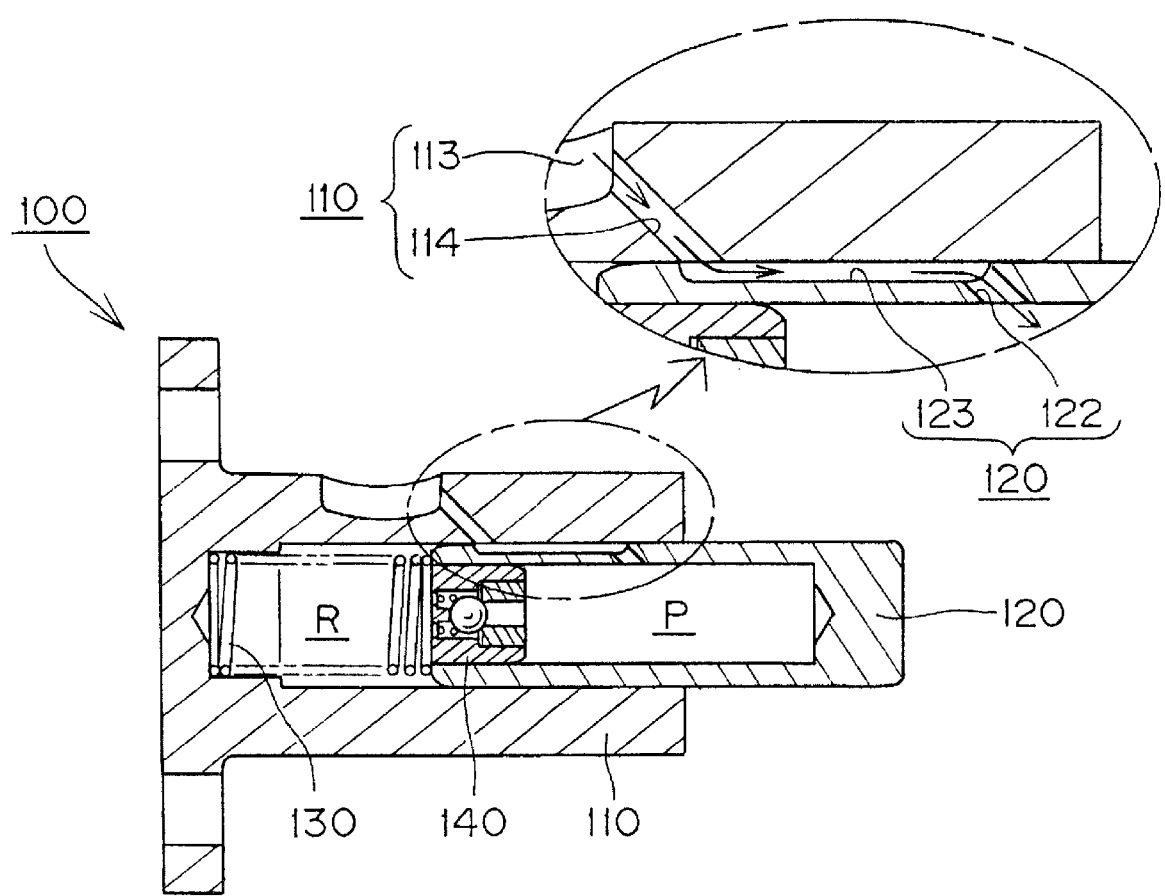
FIG. 10 is a cross-sectional view of the tensioner, showing the communication path for entry of oil into the reservoir within the plunger, when the plunger is in a fully extended condition, including an enlarged auxiliary view of the oil flow path.

The groove can be in the form of a simple flat shape milled in the outer surface of the plunger and extending in the direction of protrusion of the plunger. Because of the elongation of the groove, continuous oil communication between the oil supply bore 114 in the housing and the oil supply hole 122 in the plunger is maintained throughout the stroke of the plunger. Furthermore, as shown in FIG. 5, the groove 123 has a length X, which is preferably equal to the maximum stroke of the plunger 120, which is illustrated in FIGS. 9 and 10. Thus, groove 123 accommodates the maximum shift between the oil supply bore 114 in the housing and the oil supply hole 122 in the plunger 120. FIGS. 9 and 10 show the flow of oil from the oil supply bore 114 of the housing 114 to the oil supply hole 122 of the plunger 120.

In the hydraulic tensioner 100, since the oil storage chamber P occupies the entire inside area of the plunger 120, a maximum oil storage space is provided. When the plunger 120 is pushed into the plunger-accommodating hole 112, the amount of oil present in the high pressure chamber R is always sufficient to exhibit the necessary hydraulic damping. When the plunger 120 protrudes from the plunger-accommodating hole 112 oil from the oil storage chamber P is rapidly supplied to the high pressure oil chamber R, and consequently, there is no depletion of oil in the high pressure oil chamber, and the hydraulic damping force can be exhibited instantaneously whenever it is required. As result, backlash of the timing chain C on engine start-up is suppressed and generation of abnormal sounds can be prevented. These effects can be realized not only when the tensioner is mounted so that the plunger protrudes horizontally, but also when the tensioner is mounted so that the plunger protrudes upward or downward.

Since the oil supply hole 122 is provided on a ridge line of the plunger 120, the oil storage level in the oil storage chamber P can be maintained at least to the level of the supply hole position. Moreover, since the groove 123, which allows the oil supply bore 114 in the housing 110 to communicate with the oil supply hole 122 in the plunger 120 provides communication over a margin X (FIG. 5) at least equal to the maximum stroke of the plunger 120, the supply of oil to the oil storage chamber is reliably maintained over the full stroke of the plunger. Additionally, the number of parts required for the tensioner is significantly lower than the number of parts in a conventional hydraulic tensioner having a sleeve, and difficult machining of the inner wall of plunger-accommodating hole in the housing can be avoided. Thus the tensioner can be manufactured at a comparatively low cost.

Figure 11:
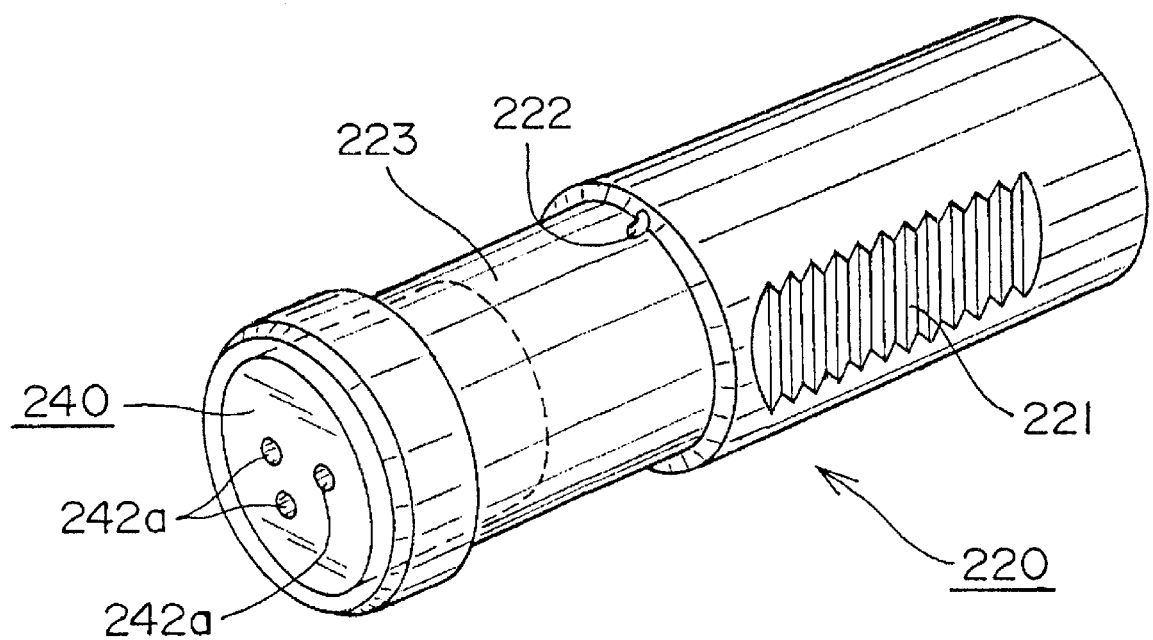
FIG. 11 is a perspective view of a plunger used in a second embodiment of the invention.
Figure 12:
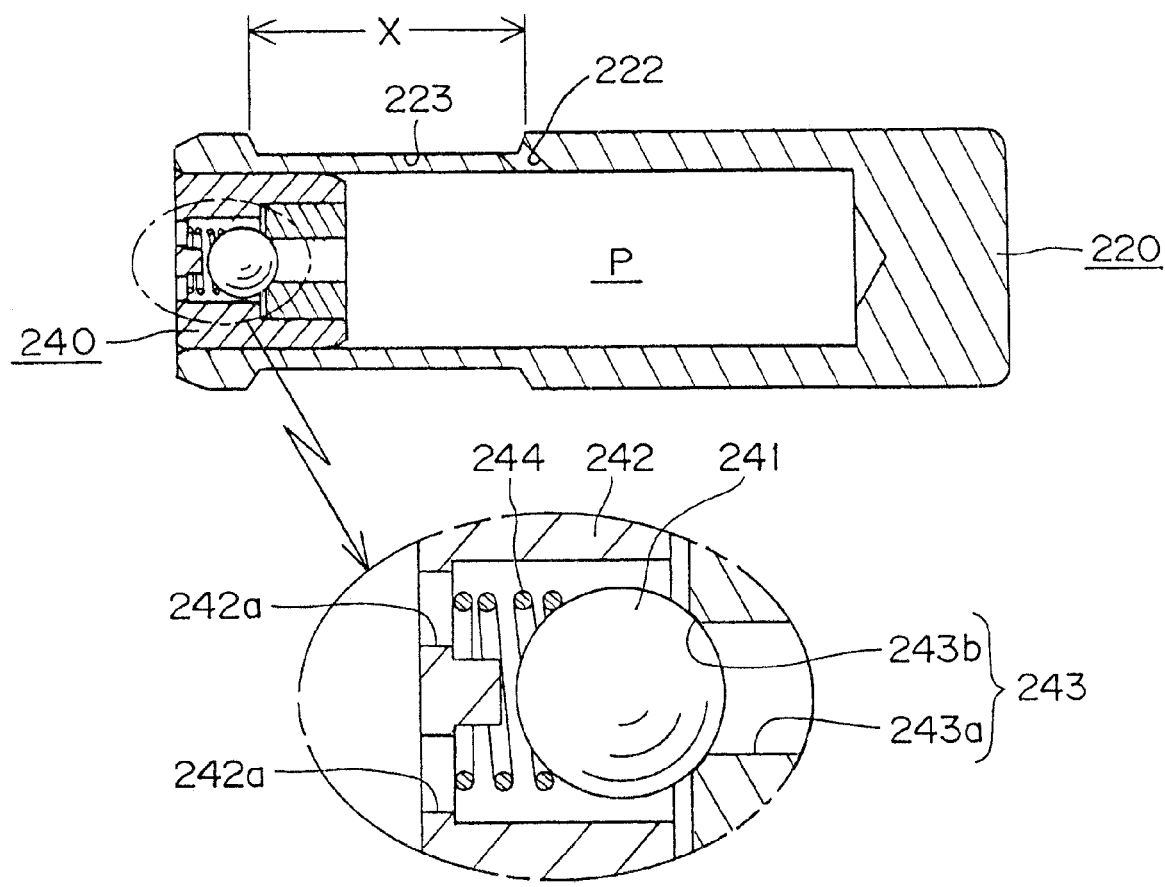
FIG. 12 is a longitudinal cross-sectional view of the plunger of FIG. 11, including an enlarged auxiliary view of the check valve assembly in the plunger.

In the second embodiment of the invention as shown in FIGS. 11 and 12, components corresponding to components of the first embodiment are designated by numbers that exceed by 100 the reference numbers of the corresponding components in the first embodiment.

In the hydraulic tensioner 200, an oil supply hole 222, which provides for flow of oil into oil storage chamber P, is disposed on a ridge line of the plunger 220, and as in the above-described first embodiment, the oil storage level in chamber P can be maintained at a level at least as high as the position of the opening of hole 222 into the oil storage chamber P.

In the second embodiment, the groove that provides for communication of oil from an oil supply bore (not shown) in the housing is in the form of a cylindrical portion of the outer wall of the plunger having a reduced diameter and a length X corresponding to the maximum stroke of the plunger. The groove 223 can be formed easily by turning and has the same effect as the flat milled surface in the plunger of the first embodiment. Here, as in the first embodiment, the complicated structure of the conventional hydraulic shock-absorbing tensioner is avoided, an adequate oil storage space in the oil storage chamber P inside the plunger is ensured, backlash of the timing chain C on engine start-up is suppressed, and the generation of abnormal sounds can be prevented.

Moreover, as in the first embodiment the tensioner of the second embodiment can be mounted with the plunger protruding upward or downward as well as horizontally, and the groove 223 maintains communication between an oil supply bore in the tensioner housing and the oil supply hole 222 in the plunger throughout the stroke of the plunger, thus ensuring a reliable supply of oil to the oil storage chamber P, and from the oil storage chamber P, through the check valve unit 240, to a high pressure oil chamber formed by the plunger and the plunger-accommodating hole in the tensioner housing. As in the first embodiment, fewer parts than those of a conventional shock-absorbing tensioner are required, and manufacture is inexpensive, especially since difficult machining of the inner wall of the plunger-accommodating hole of the tensioner housing is unnecessary.

What is claimed is:

1. A hydraulic tensioner comprising:
   a housing having a plunger-accommodating hole;
   a plunger slidable in the plunger-accommodating hole and protruding therefrom in a protruding direction from a position of minimum protrusion to a position of maximum protrusion, for applying tension to an endless, flexible, traveling, timing transmission chain, said plunger having a hollow bore extending from a rear end of the plunger to an internal location adjacent an opposite end of the plunger, and forming an internal oil storage space within the plunger;
   a plunger-biasing spring accommodated in a high pressure oil chamber formed between said plunger-accommodating hole and a rear end of said plunger, said spring biasing the plunger in said protruding direction;
   a check valve unit, press-fit in the rear end of said plunger and closing said internal oil storage space, the check valve unit being arranged to allow flow of oil from said internal oil storage space to said high pressure oil chamber while blocking reverse flow of oil from the high pressure oil chamber to the oil storage space; and
   an oil supply hole connecting the internal oil storage chamber to the exterior of the plunger, for supplying oil to said internal oil storage chamber;
   in which the housing has an outer surface, an oil introduction recess formed in said outer surface and having a bottom, and an oil supply bore extending from said bottom of the oil introduction recess to the interior of the plunger-accommodating hole and providing a path for flow of oil from the exterior of the housing to the interior of the plunger-accommodating hole;
   in which the plunger has an outer peripheral surface and a recess formed in said outer peripheral surface;
   in which said oil supply hole in the plunger has an opening within said recess;
   in which the recess formed in the outer peripheral surface of the plunger, extends in the direction of protrusion of the plunger, at least from a location at which it is in register with the oil supply bore when the plunger is in said position of minimum protrusion to a location at which it is also in register with the oil supply bore when the plunger is in said position of maximum protrusion, whereby oil is allowed to flow from the oil supply bore to the oil supply hole throughout the stroke of the plunger;
   in which the length of the recess formed in the outer peripheral surface of the plunger, in the direction of protrusion of the plunger, is equal to the maximum stroke of said plunger; and
   in which the oil supply bore extends from said bottom of the oil-introduction recess to the interior of the plunger-accommodating hole diagonally both downward and in the protruding direction of the plunger.

2. A hydraulic tensioner according to claim 1, in which said oil supply hole is located on a ridge line of the plunger.

* * * * *